United States Patent
Kerr

(10) Patent No.: US 6,815,980 B2
(45) Date of Patent: Nov. 9, 2004

(54) TERMINATION CIRCUIT FOR A DIFFERENTIAL TRANSMISSION LINE

(75) Inventor: Michael K. Kerr, Johnson City, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 10/375,334

(22) Filed: Feb. 27, 2003

(65) Prior Publication Data

US 2004/0169525 A1 Sep. 2, 2004

(51) Int. Cl.⁷ ................................................ H03K 17/16
(52) U.S. Cl. ............................ 326/30; 326/86; 326/90
(58) Field of Search .............................. 326/30, 86, 90, 326/26, 27, 83; 327/77, 308, 306

(56) References Cited

U.S. PATENT DOCUMENTS

| | | | | |
|---|---|---|---|---|
| 5,528,168 A | * | 6/1996 | Kleveland | 326/30 |
| 5,546,016 A | * | 8/1996 | Allen | 326/30 |
| 5,666,078 A | | 9/1997 | Lamphier et al. | 327/108 |
| 5,686,872 A | * | 11/1997 | Fried et al. | 326/30 |
| 5,687,330 A | | 11/1997 | Gist et al. | 395/309 |
| 5,920,266 A | * | 7/1999 | Allgood et al. | 326/30 |
| 5,977,797 A | | 11/1999 | Gasparik | 326/86 |
| 6,072,943 A | | 6/2000 | Gasparik et al. | 395/500.03 |
| 6,084,424 A | | 7/2000 | Gasparik | 326/30 |
| 6,127,840 A | * | 10/2000 | Coteus et al. | 326/30 |
| 6,147,520 A | * | 11/2000 | Kothandaraman et al. | 327/77 |
| 6,218,854 B1 | * | 4/2001 | Ko | 326/30 |
| 6,362,644 B1 | | 3/2002 | Jeffery et al. | 326/30 |
| 6,366,128 B1 | | 4/2002 | Ghia et al. | 326/83 |
| 6,424,200 B1 | | 7/2002 | McNitt et al. | 327/308 |

* cited by examiner

Primary Examiner—Michael Tokar
Assistant Examiner—Lam T. Mai
(74) Attorney, Agent, or Firm—Arthur J. Samodovitz

(57) ABSTRACT

A termination circuit for a differential transmission line. The termination circuit comprises a plurality of resistive sub circuits. Each of the resistive sub circuits comprises a PFET and an NFET in parallel. A first resistor is connected at one end to a drain of the NFET and a source of the PFET, and connected at an opposite end to one line of the differential transmission line. A second resistor is connected at one end to a source of the NFET and a drain of the PFET, and connected an opposite end to another line of the differential transmission line. Optionally, there is another resistor connected between the differential transmission line, whereby the termination resistance is based on this other resistance in parallel with one or more of the resistive sub circuits which are enabled. Means are provided to selectively enable one or more of the resistive sub circuits to yield a desired resistance to terminate the differential transmission line.

2 Claims, 4 Drawing Sheets

TERMINATION CIRCUIT FOR A DIFFERENTIAL TRANSMISSION LINE

The invention relates generally to a termination circuit for a differential transmission line, and deals more particularly with a programmable termination circuit for a differential transmission line.

Differential transmission lines with a termination resistor and a differential receiver are well known today. Proper termination is required at the end of the transmission line/input of the differential receiver to avoid reflections and to accurately receive the transmitted signal. This is particularly important for low voltage signals when noise levels are significant. Noise levels tend to be high in high speed data transfer and fast switching environments.

Reduced noise margins and increasingly faster switching frequencies require tighter tolerances for the termination circuitry. It is difficult to meet the tight tolerances without dynamic adjustment because of variations in manufacturing processes and operating temperatures which both affect the magnitude of passive resistors and active resistors semiconductors. The following dynamic compensation techniques are currently known. U.S. Pat. No. 6,424,200 discloses a variable termination circuit for a non differential transmission line. The termination circuit switches parallel resistance branches in or out of the termination impedance circuit such that an effective termination impedance is selected based upon a control signal. U.S. Pat. No. 5,687,330 also discloses a termination circuit for a non differential transmission line.

An object of the present invention is to provide a programmable termination resistance for a differential transmission line.

Another object of the present invention is to provide a programmable termination resistance of the foregoing type which is automatically compensated for temperature variations and manufacturing process variations from chip to chip.

SUMMARY OF THE INVENTION

The invention resides in a termination circuit for a differential transmission line. The termination circuit comprises a plurality of resistive sub circuits. Each of the resistive sub circuits comprises a PFET and an NFET in parallel. A first resistor is connected at one end to a drain of the NFET and a source of the PFET, and connected at an opposite end to one line of the differential transmission line. A second resistor is connected at one end to a source of the NFET and a drain of the PFET, and connected an opposite end to another line of the differential transmission line. Optionally, there is another resistor connected between the differential transmission line, whereby the termination resistance is based on this other resistance in parallel with one or more of the resistive sub circuits which are enabled. Means are provided to selectively enable one or more of the resistive sub circuits to yield a desired resistance to terminate the differential transmission line.

DETAILED DESCRIPTION OF THE PREFERRED EMBODIMENTS

Figure 1:
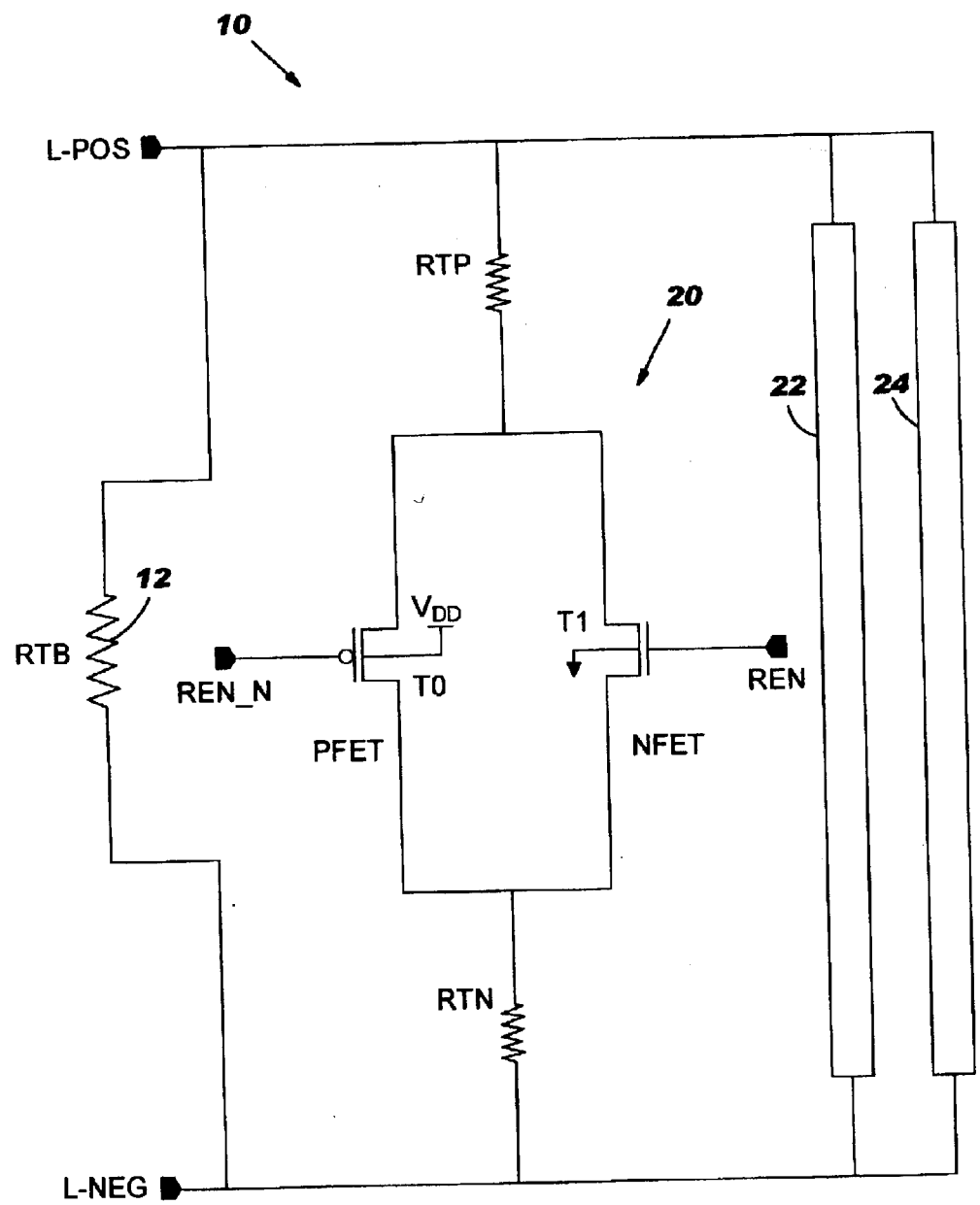
FIG. 1 is a circuit diagram of a programmable termination circuit according to the present invention.

Referring now to the drawings in detail wherein like reference numbers and acronyms indicate like elements throughout, FIG. 1 illustrates a programmable termination circuit generally designated 10 according to the present invention. Circuit 10 comprises a base resistor 12 that is optional and multiple resistance segments 20, 22 and 24 in parallel, although only one such segment 20 is illustrated in detail in FIG. 1. As explained in more detail below, the number of segments 20 determines the number of gradations of termination resistance that can be programmed, the more segments the greater the number of gradations available. The base resistor 12 is formed by a thin metal conductor or passive semiconductor path where the resistance is based on the cross-sectional area and length of the conductor or passive silicon path, as is known in the semiconductor art. Each resistive segment 20 comprises a full CMOS pass gate, i.e. a PFET T0 and an NFET T1 in parallel, and two resistors RTP and RTN in series with the full CMOS pass gate, one on each side of the FETs. The two series resistors are provided by a thin metal conductor or a passive silicon path, where the resistance is based on the cross-sectional area and length of the conductor or passive silicon path, as is known in the semiconductor art. One conductor 30 of the differential transmission line, labeled "L-Pos" for convenience, is connected to all resistors RTP, and the other conductor 32 of the differential transmission line, labeled "L-Neg" for convenience, is connected to all resistors RTN. A substrate of NFET T1 is connected to ground and a substrate of PFET T0 is connected to a positive voltage source, Vdd, for the chip in which the circuit 10 is integrated. REN and REN_N are enable input signals to the gates T1 and T0, respectively, where REN_N is the compliment of REN. Thus, both FETs in each resistor segment are either enabled as a unit or disabled as a unit.

The full CMOS pass gate of the present invention provides a viable termination resistance over a wider differential signal range than just PFETs alone or NFETs alone, as demonstrated by the following. Assuming the transmission line signals applied between L-Pos and L-Neg are symmetric, the following equation defines conditions where all the NFETs alone (or by analogy all the PFETs alone) would be off and therefore not participate in the termination resistance as required:

$Vgate-Vcm+ABS\ Vsig<Vt$, where

"Vgate" is the voltage level applied to the NFET gates,

"Vcm" is the common mode voltage of the differential signal applied between L-Pos and L-Neg, "ABS Vsig" is the absolute value of the signal voltage above or below the common mode voltage, and "Vt" is the threshold voltage level required to switch the NFET.

If only NFETs were used (unlike the present invention) with Vdd=2.5V, Vt=0.6 V, Vcm=2.1V and Vsig=0.1V, the gate voltage would equal 2.5V−2.1V+0.1V=0.5V which is insufficient to activate the NFET with its Vt of 0.6V. However, under these same voltage conditions in the present invention with a PFET in parallel with the NFET in each segment, and with Vt=−0.6V and Vgate=0V for the PFET, Vgate−Vcm+ABS Vsig=0V−2.1V+0.1V=−2.0V which is less than −0.6V required to activate the PFET. Therefore, in the present invention, the PFET will be enabled to participate in the termination resistance as required. In the present invention, at least one of the NFET and PFET in each segment that is sent the enable control signal is actually activated to participate in the termination resistance. For most signal levels, both the NFET and PFET in each segment that are sent the enable control signal are actually activated to participate in the termination resistance. As described in more detail below, there is inherent resistance compensation within each segment such that the composite resistance across each resistance segment 20 remains within a usable range regardless of whether one or both of the NFET and PFET of each segment are actually activated when supplied with the enable control signal.

The drain to source path of each NFET, T1, and each PFET, T0, of the present invention provides resistance inherent to the semiconductor material. However, as explained above, each resistive segment 20 of the present invention includes two other resistors, RTP and RTN, in series with the NFET and PFET pair. The tolerance of the resistors RTP and RTN is better than the tolerance of the resistance inherent to the drain to source paths of the FETs. Connecting the resistors RTP and RTN to both sides of the FETs provides ESD protection from both transmission line inputs as well as a balanced load to the differential transmission line. Also, resistors RTP and RTN prevent a possible short to ground or between the terminals for high frequencies during the brief moment when the FET is being enabled. Resistors RTP and RTN ensure that there is always some resistance between the differential transmission line.

Figure 2:
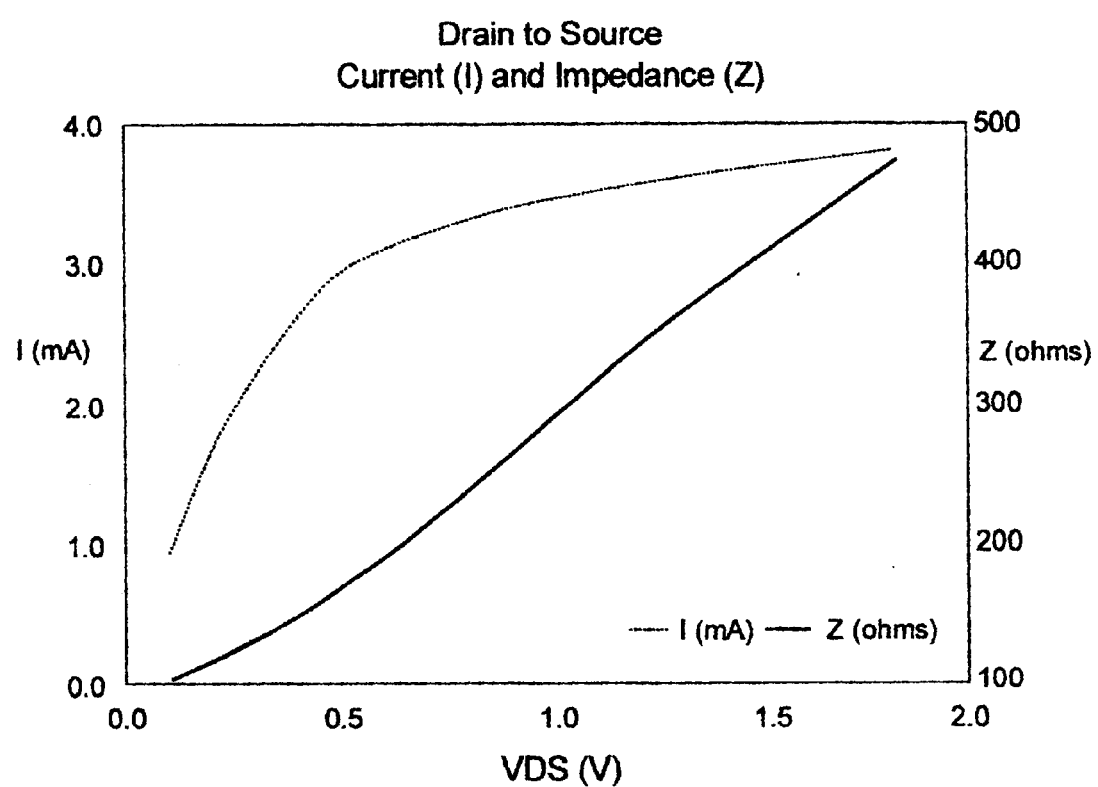
FIG. 2 is a graph of drain to source resistance versus drain to source voltage for a fixed Vgate of an FET of the termination circuit of FIG. 1.

There is yet another advantage to the combination of the series resistors RTP and RTN with the parallel FETs in each segment. The resistance of resistors RTP and RTN varies with the manufacturing process and operating temperature, but not with Vdd. The drain to source resistance of the FETs varies with the drain to source voltage. FIG. 2 shows the relationship of the drain to source resistance to the drain to source voltage for a fixed Vgate. If the magnitude of resistors RTP and RTN is higher than nominal, this will tend to reduce the voltage across the drain to source of the FETs (because more of the voltage drop tends to be across RTP and RTN). But, as illustrated in FIG. 2, as the drain to source voltage decreases, the drain to source resistance drops as well. This compensates, to some degree, for the increased resistance across RTP and RTN so that the overall termination resistance is maintained and self adjusting within a usable range. This self compensating effect also reduces placement restrictions for where the receiver can be placed on a chip. There is inherent and sometimes significant resistance in the metal wiring (conductors 30 and 32 in FIG. 1) that connects the receiver to the chip bonding pads and this must be accounted for in the differential termination design and placement. The self compensating effect described above tolerates more metal wiring resistance than a terminator made of resistors alone.

Figure 3:
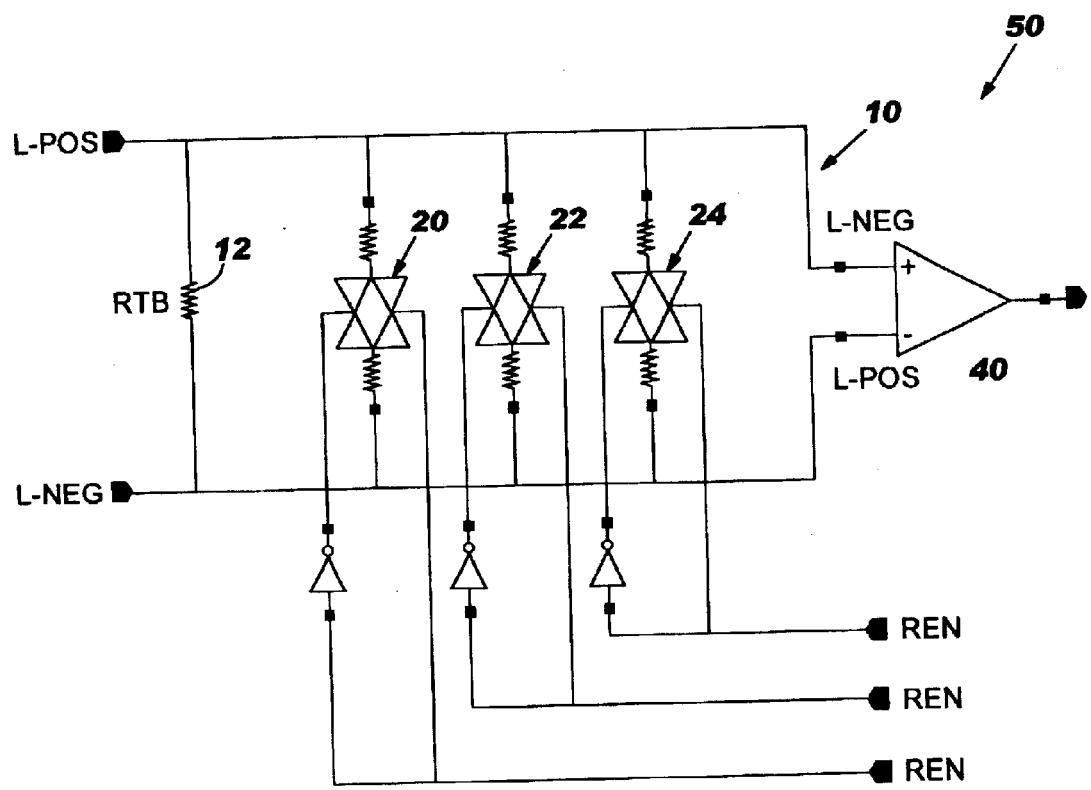
FIG. 3 is a more detailed diagram of the circuit of FIG. 1 and an associated receiver circuit.

FIG. 3 illustrates in detail base resistor 12, the multiple, similar resistor segments 20, 22, 24 of the circuit 10 and a differential receiver circuit 40, all integrated into a semiconductor chip 50. Together with the base resistor 12, segments 20, 22 and 24 comprise a programmable termination circuit for the receiver circuit 40. The base resistor 12 will have an inherent tolerance with a predictable minimum resistance value for a given semiconductor technology and system temperature range. This resistor is designed so that its minimum possible resistance value is the requisite termination resistance. However, under normal operating conditions where the chip temperature rises, the magnitude of the base resistor will increase. Also, the manufacturing tolerance of the base resistor may result in a higher than desired value. So, to compensate, one or a combination of the resistance segments 20, 22, 24 are "turned-on" by enabling the FETs in these segment(s). This will put one or more non-infinite resistors in parallel with the base resistor 12 to lower the overall termination resistance. The number of resistance segments which are enabled, and the cumulative resistance across each resistance segment 20, determine the composite termination resistance.

Figure 4:
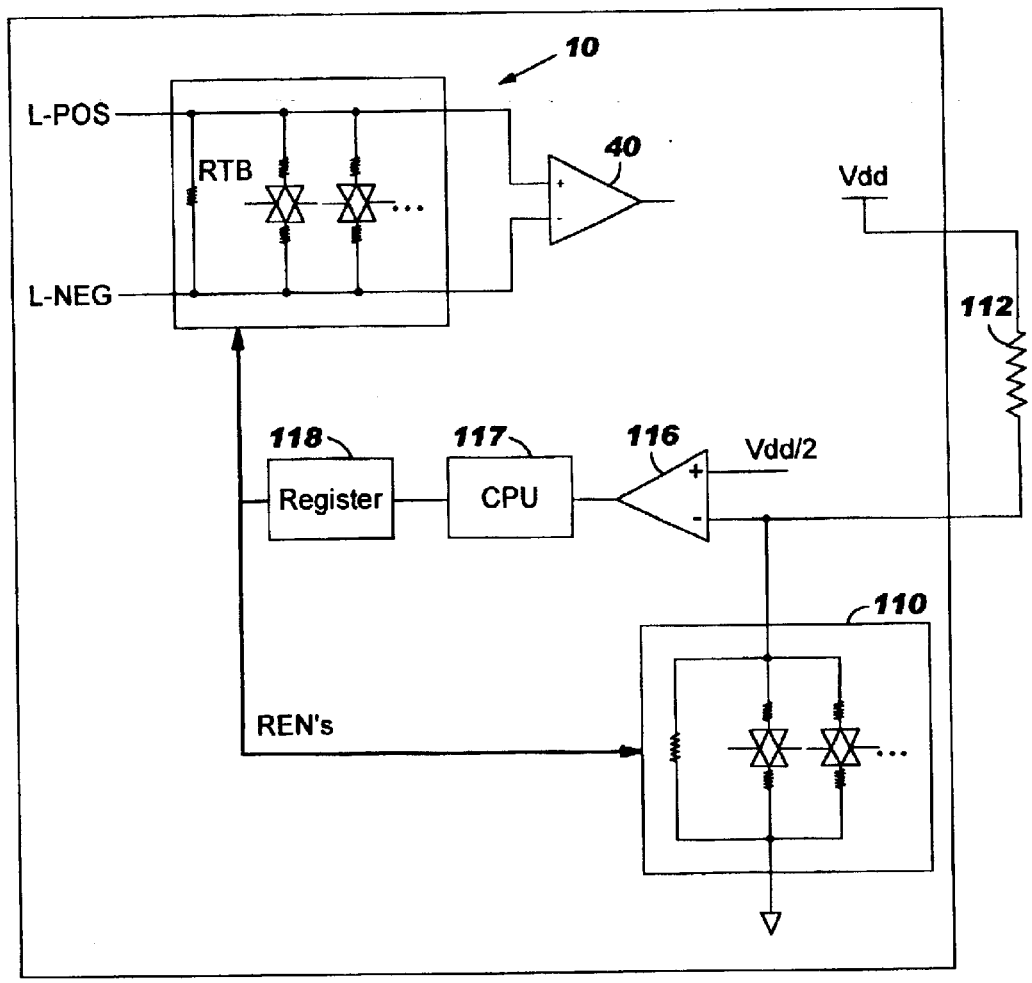
FIG. 4 is circuit diagram of a chip which includes the circuitry of FIG. 3 and a calibration circuit for the programmable termination circuit of FIG. 1.

Because there are manufacturing, temperature and Vdd effects on the base resistor 12 and the drain to source resistance of segments 20, 22 and 24, a calibration technique will be required to determine the number of resistance segments to enable as a function of current conditions. One example of such a calibration technique is illustrated in FIG. 4 and performed as follows. A precision resistor 112 is provided external to the module or chip that contains the programmable termination circuit 10 and receiver 40. The magnitude of this external precision resistor equals the ideal termination resistance for the differential transmission line. The magnitude of the external, precision resistor is independent of Process/Voltage/Temperature ("PVT") conditions of the chip. A copy 10 of the programmable termination circuit 10 is also integrated into the chip. A voltage divider circuit is created from the chip power supply, Vdd, through the precision resistor 112 and then through the copy 110 of the programmable termination circuit 10 to chip ground. For a current PVT condition, a comparator circuit 116 compares the voltage generated across the precision resistor to Vdd/2 (which can be reliably and accurately generated on the chip). The output of the comparator is fed to a processor 117. If the generated voltage is above Vdd/2, then the resistance of the termination circuit 10 is too low and segments of the termination circuit 110 are turned off, until the voltage across the precision resistor is Vdd/2. Conversely, if the voltage across the precision resistor is less than Vdd/2, segments of the termination circuit 10 are turned on until the voltage across the precision resistor equals Vdd/2. After this "trial and error process" or "tuning process", a register 118 stores the correct bit pattern required for the current PVT conditions to provide the desired termination resistance. The calibration buffer is connected through circuitry to enable control for the segments 20, 22 and 24 for the actual programmable termination circuit 10. As temperature and voltage change dynamically or periodically, the foregoing process is repeated to determine the proper segments to turn on and off.

Based on the foregoing, a programmable termination circuit according to the present invention has been disclosed. However, numerous modifications and substitutions can be made without deviating from the present invention. For example, it is also possible to make the foregoing voltage divider with the actual programmable termination circuit 10 (instead of copy circuit 110) to avoid inaccuracies caused by differences between copy circuit 110 and the actual termination circuit 10, and provide a switch between the circuit 110 and the precision resistor to disconnect the precision resistor during actual usage of termination circuit 10. Also, resistor 12 of FIG. 1 could be removed to create a differential terminator that can be completely disabled. This could be useful for creating a signal bus that can be driven both differentially in nature and in a single ended fasion with CMOS signaling levels. Therefore, the present invention has been disclosed by way of illustration and not limitation, and reference should be made to the following claims to determine the scope of the present invention.

What is claimed is:

1. A method for terminating a differential transmission line based on a type of load activated through said transmission line, said transmission line comprising first and second differential signal lines, said method comprising the steps of:

providing as an integrated circuit a plurality of resistive sub circuits for terminating said transmission line, each of said resistive sub circuits comprising a PFET;

an NFET in parallel with said PFET;

a first resistor connected at one end to a drain of said NFET and a source of said PFET, and connected at an opposite end to said first differential signal line of said differential transmission line; and a second resistor connected at one end to a source of said NFET and a drain of said PFET, and connected at an opposite end to said second differential signal line of said differential transmission line; and wherein there is a substantially open circuit between said first and second differential signal lines at an end of said transmission line adjacent to said load, other than said plurality of resistive subcircuits when activated and an input resistance of said load;

when said type of load requires termination of said transmission line with approximately a same impedance as an impedance of said transmission line, activating one or more or said plurality of resistive subcircuits to provide approximately said same impedance to terminate said transmission line; and when said type of load requires termination of said transmission line with substantially open circuit impedance, deactivating all of said plurality of resistive subcircuits to provide substantially open circuit termination impedance except for said input resistance of said load.

2. A method as set forth in claim 1 wherein said first and second resistors are each larger in magnitude than a drain source resistance of said NFET and PFET.

\* \* \* \* \*